US006567901B1

(12) United States Patent
Neufeld

(10) Patent No.: US 6,567,901 B1
(45) Date of Patent: May 20, 2003

(54) READ AROUND SPECULATIVE LOAD

(75) Inventor: E. David Neufeld, Tomball, TX (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/514,981

(22) Filed: Feb. 29, 2000

(51) Int. Cl.[7] .............................................. G06F 13/18
(52) U.S. Cl. ..................... 711/158; 711/154; 711/155; 711/156; 711/157; 711/167; 711/168; 711/169; 712/207; 712/237
(58) Field of Search .................. 711/154–158, 167–169, 711/145, 146; 712/207, 237

(56) References Cited

U.S. PATENT DOCUMENTS

| | | | | |
|---|---|---|---|---|
| 5,603,061 A | | 2/1997 | Hilley et al. ................ | 395/864 |
| 5,802,588 A | * | 9/1998 | Ramagopal et al. ........ | 711/156 |
| 6,006,317 A | * | 12/1999 | Ramagopal et al. .......... | 712/23 |
| 6,058,461 A | * | 5/2000 | Lewchuk et al. ........... | 711/158 |
| 6,163,839 A | * | 12/2000 | Janik et al. ................. | 712/219 |
| 6,233,657 B1 | * | 5/2001 | Ramagopal et al. ........ | 711/146 |
| 6,247,115 B1 | * | 6/2001 | Janik et al. ................. | 712/219 |
| 6,298,424 B1 | * | 10/2001 | Lewchuk et al. ........... | 711/137 |

OTHER PUBLICATIONS

*A Tour of the Pentium(R) Pro Processor Microarchitecture*, Intel Corporation; 1998; 9 pages.
*Pentium (R) Pro Processor Technical Glossary*, Intel Corporation; 1998; 3 pages.

\* cited by examiner

Primary Examiner—T. V. Nguyen
(74) Attorney, Agent, or Firm—Fletcher, Yoder & Van Someren

(57) ABSTRACT

A processor of a system initiates memory read transactions on a bus and provides information regarding the speculative nature of the transaction. A bus device, such as a memory controller, then receives and processes the transaction, placing the request in a queue to be serviced in an order dependent upon the relative speculative nature of the request. In addition, the processor, upon receipt of an appropriate signal, cancels a speculative read that is no longer needed or upgrades a speculative read that has become non-speculative.

32 Claims, 4 Drawing Sheets

READ AROUND SPECULATIVE LOAD

BACKGROUND OF THE INVENTION

1. Field of the Invention

The present invention relates generally to a method of handling memory reads in a computer system and, more particularly, to a method that indicates to a computer's memory subsystem that a current read request is speculative so that the subsystem can service non-speculative read requests first.

2. Description of the Related Art

With the ever-increasing amount of data being processed by today's computer systems, the efficient use of computer resources is very important. The processing power of computer systems is often increased by adding processors. In today's multi-processor computer systems, memory read requests are typically serviced on a first-come-first-served basis, and a processor that has issued a memory request might be paused by other requests that are ahead of it in the memory subsystem. The memory subsystem can be a bottleneck in processing speed because the memory subsystem's physical devices typically operate more slowly than a computer's processor or because multiple processors are using the same memory subsystem. To address this concern many processors issue read requests before data is actually needed and often even before it is known whether the data will ever be needed. An example of this occurs when a processor approaches a branch. Not knowing which path of a program will be executed, a processor may request the data necessary for both paths so that the program, when it reaches the branch, can continue regardless of the path chosen. This typically helps the performance of a processor in a single processor system, but in a multiple processor system memory bandwidth is limited and these extra requests can hurt the performance of other processors in the system. Being able to cancel unneeded memory cycles in that case would be particularly beneficial.

Another example of a processor performing operations that are speculative is when a processor, such as the PENTIUM® Pro manufactured by the Intel Corporation of Santa Clara, Calif. utilizes "speculative execution." Speculative execution is a mechanism in which the processor maintains an "instruction queue," looks ahead in the instruction queue and performs instructions out of order rather than waiting for unread operands. The results of the out-of-order instructions are stored in an "instruction pool." Once it is apparent that an instruction is necessary and all previous instructions in the queue have been completed, the results stored in the instruction pool are committed to memory, either registers, RAM, or disk. When an instruction is a branch, the processor typically makes a guess as to the most likely path. If the guess is ultimately wrong, the processor clears the unneeded instructions and results from the instruction pool.

In the speculative execution environment, a read request may also be marked speculative if it is uncertain whether the value of an operand might change after the instruction is executed but before the result is committed. In that case, the instruction needs to be re-executed with correct data before the result is committed.

Although current processors typically speculate concerning instructions and data that might be needed, current memory subsystems are designed to service memory requests in a first-come-first-served order.

SUMMARY OF THE INVENTION

In a system implemented according to the invention, a processor initiates memory read transactions on a bus, and when the read is a speculative load, the processor provides information regarding the speculative nature of the transaction. A bus device, such as a memory controller, then receives the transaction and places the request in a queue to be serviced in an order dependent upon the relative speculative nature of the request. Transactions that are "non-speculative" are serviced before transactions that are "speculative."

In addition, the bus device, upon receipt of an appropriate signal, cancels a speculative read that is no longer needed or upgrades the priority of a speculative read that has become non-speculative. If data required for a load is not available in a computer's random access memory (RAM) or cache memory, a page fault typically occurs, resulting in a disk read. In the case of a speculative load that is ultimately cancelled, by "putting off" the speculative load, an unnecessary page fault (and the resulting disk read) might be prevented.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
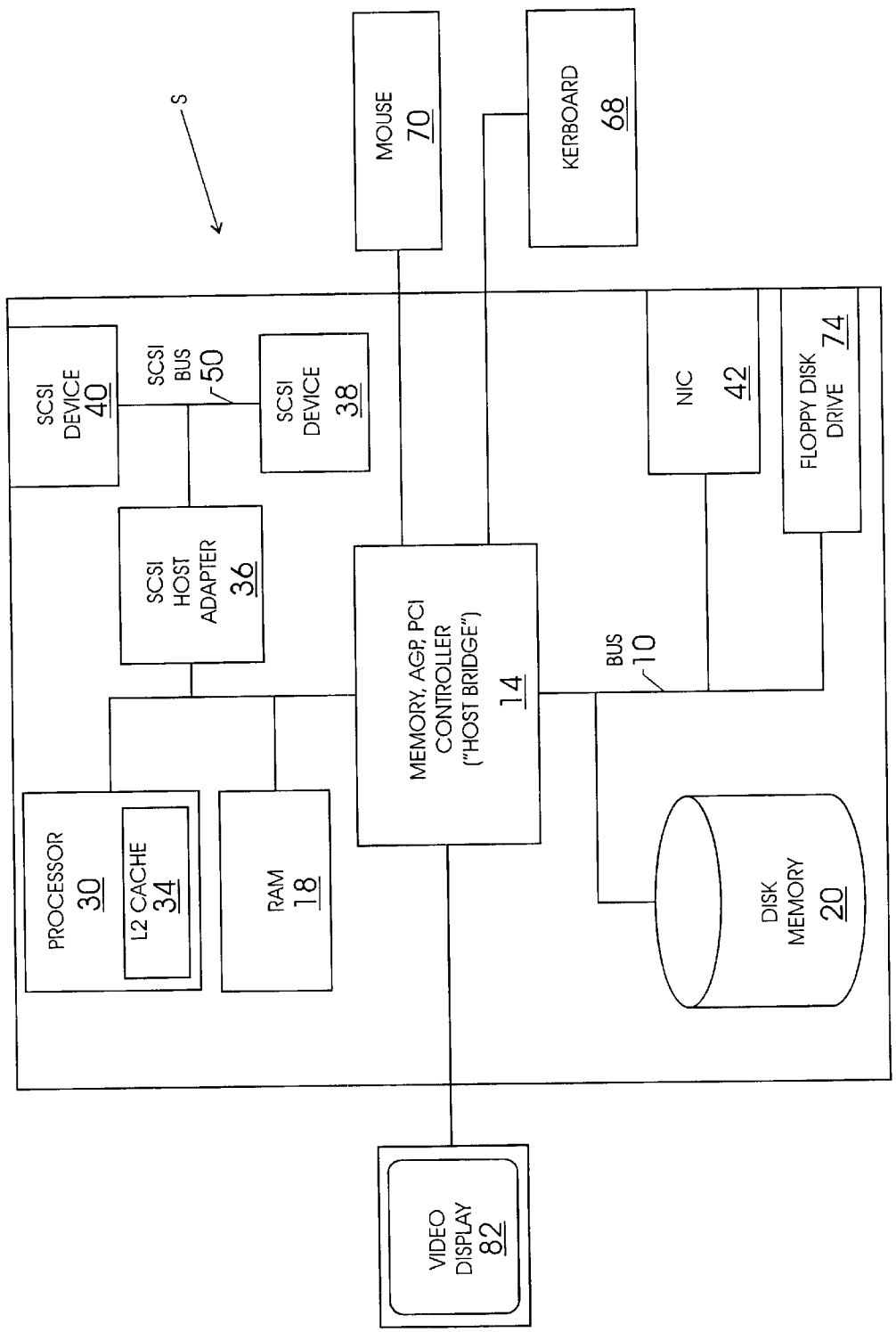
FIG. 1 is a block diagram of a computer system S according to the invention showing peripheral devices and data/address buses.

Turning to FIG. 1, illustrated is a typical computer system S implemented according to the present invention. The computer system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 30, random access memory (RAM) 18 and a disk memory subsystem 20. The processor 30 includes a microprocessor a level two (L2) cache 34.

The host bridge 14 in the disclosed embodiment is a 440LX Integrated Circuit by Intel Corporation, also known as a PCI AGP Controller (PAC). The processor 30 is preferably a PENTIUM® Pro, manufactured by the Intel Corporation of Santa Clara, Calif. The processor 30 could be replaced with a different processor, other than the PENTIUM® Pro, without detracting from the spirit of the invention.

The PCI bus 10 couples a variety of devices that generally take advantage of a high-speed data path. This includes a network interface controller (NIC) 42, which preferably supports the ThunderLan™ power management specification by Texas Instruments, and a floppy disk drive 74. The floppy disk drive 74 preferably would be a 3½" floppy disk. A video display 82, a mouse 70, and a keyboard 68 can also be coupled to the host bridge 14, enabling human interaction with the computer system S.

Finally, SCSI host adapter 36 is shown connected to the PCI bus 10. Connected to the SCSI host adapter 36 by means of a SCSI bus 50 are two SCSI devices 38 and 40. The SCSI device 38 might be an internal device such as a CD-ROM drive or a tape drive. For the purposes of this example, the SCSI device 40 might be an external disk array.

The computer system S illustrates only one platform in which the system according to the present invention can be implemented. The disclosed techniques can, without distracting from the spirit of the invention, be implemented in many systems that contains a memory subsystem, regardless of whether the device contains less, additional, or different components than the system in FIG. 1.

Figure 2:
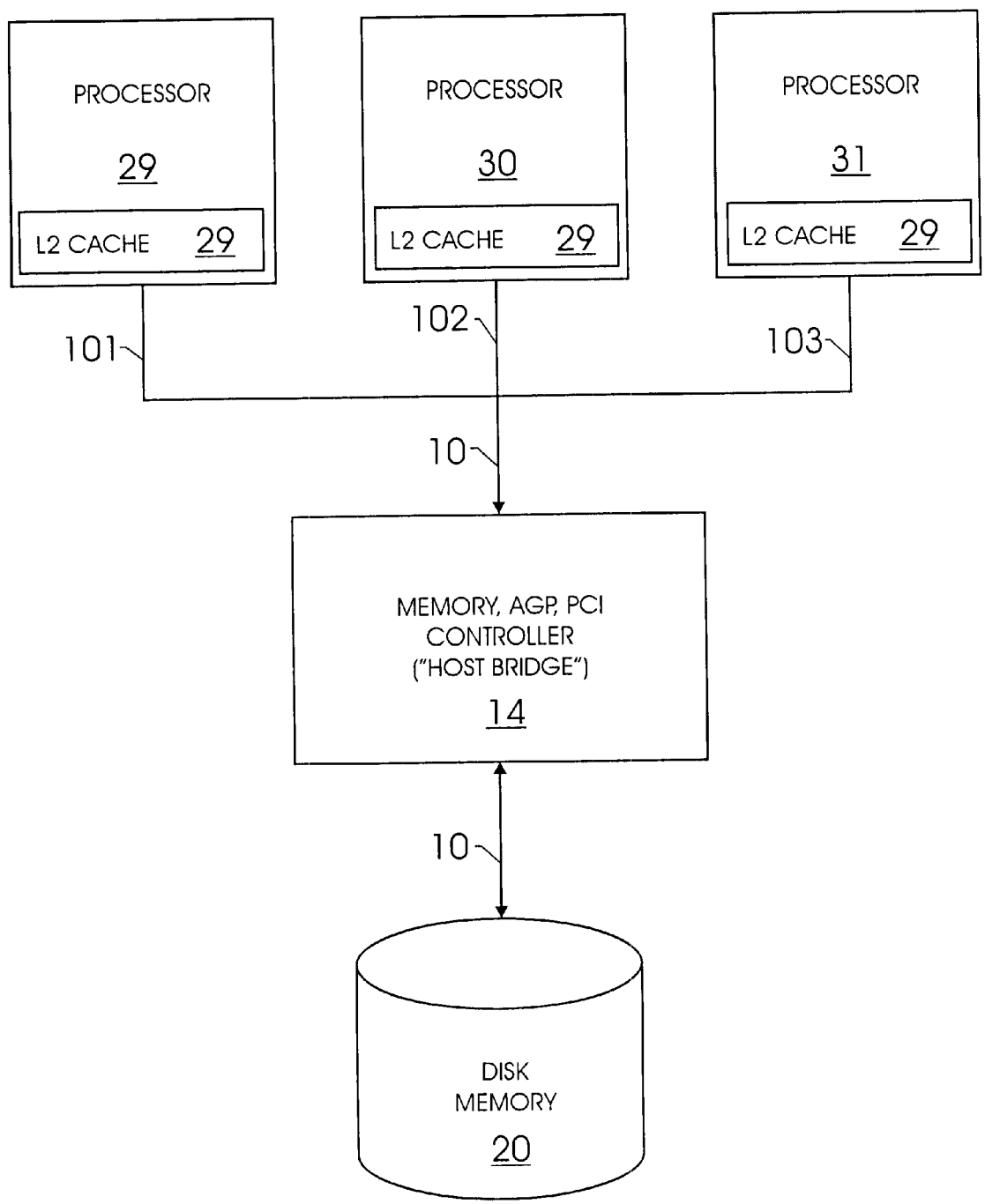
FIG. 2 is a portion of FIG. 1 showing the computer system S with multiple processors.

Turning to FIG. 2, illustrated is a portion of the computer system shown in FIG. 1 but which contains multiple processors 29, 30, and 31 with L2 Caches 33, 34, and 35 respectively. The processors 29, 30, and 31 are each connected to their own host buses 101, 102, and 103 respectively, which in turn connect to the PCI bus 10. A random access memory (RAM) 18 serves all of the processors 29, 30, and 31.

Figure 3:
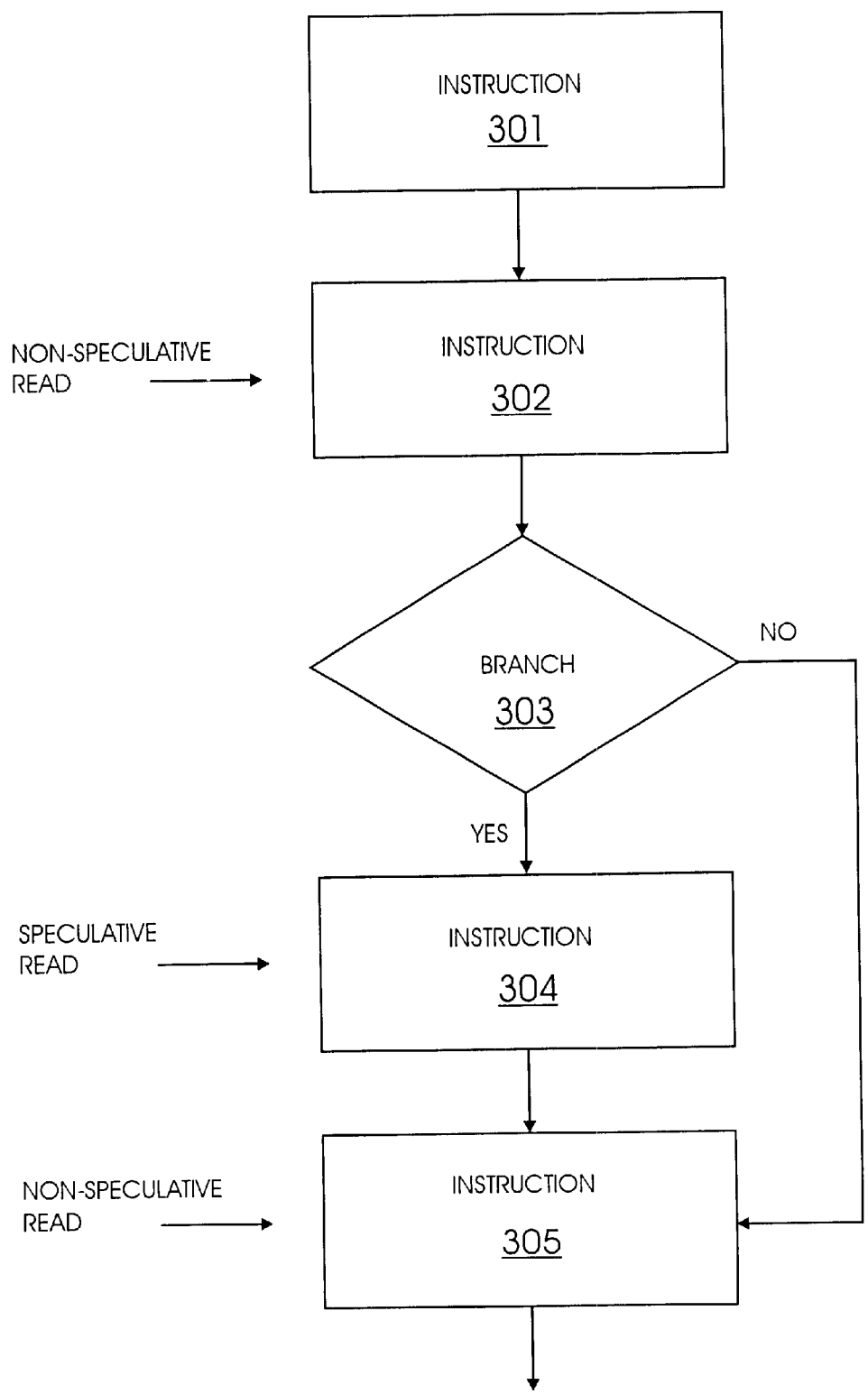
FIG. 3 is a block diagram of software running on the computer system S illustrating speculative and non-speculative reads.

Turning to FIG. 3, illustrated is block diagram of a section of software 300 that runs on the computer system S and is in the processor's 30 instruction queue. A processor 30 may execute an instruction 301 generated by an application 451 (see FIG. 4). If the data necessary to process the instruction 301 is not yet loaded, the processor 30 would typically look ahead for instructions that can be performed immediately or data that may be needed eventually. In this example, an instruction 302 may need data that does not depend upon the result of the processing of the instruction 301. In that case, the processor 30 would issue a non-speculative load, or read, request. Although in this example read requests are serviced from the RAM 18, data necessary to service a read request may be located in the computer system's RAM 18, hard disk memory 20, registers or the L2 cache 34. The disclosed techniques apply wherever data is located in the memory sub-system.

Also in the processor 30 instruction queue is a branch 303. The processor 30 might request data from memory 20 to service instructions following the branch 303 while (or before) instruction 301 is executing. Upon processing the branch 303 from memory 20, the processor 30 can determine that there are two possible paths the application 451 can follow, a Yes path and a No path. Not knowing whether the application 451 will eventually take the Yes path or the No path, the processor 30 when implementing speculative loads would typically submit a read request for any data needed by both the instruction 304 and the instruction 305 in spite of the uncertainty of whether they will ultimately be processed. In this example, regardless of which path, Yes or No, is taken, an instruction 305 will be executed by the processor 30. In accordance with the present invention, the data for instruction 304 would be requested from memory with a status of speculative.

The data necessary for instruction 305 would typically be requested from memory with a status of speculative as well. This is because the instruction 305 is one possibility of a branch, and the processor 30 will typically simply label both paths as speculative, even though it turns out that the instruction 305 will always be executed. The processor 30, however, could be intelligent enough to look ahead and see that the instruction 305 will always be executed and that the data required does not depend upon previous, unexecuted instructions. In that case that data can be initially requested with a status of speculative because it is not needed immediately. Later, if the memory subsystem never has the bandwidth to fetch the data, then the request can be upgraded to non-speculative. The point is that the data (the program code for instruction 305) will definitely be needed but giving it too high of a priority can place it in front of items that will be needed sooner.

In another embodiment, the instruction set of the processor 30 could be such that a compiler could predetermine the speculative or non-speculative native of the transaction 305 and pass that information to the processor 30, such as with a bit encoded in the instruction. Either way, the processor 30 labels some transactions as speculative and some as non-speculative.

In a further embodiment, an additional status of "needed, but not right now" can be used. The branch prediction logic inside the processor 30 can use this status, for example. The branch prediction logic "knows" the processor 30 is going to loop several more times, but eventually will definitely need the subsequent instruction after the loop. Preferably, the branch prediction logic would wait until the loop was near termination to issue the "needed, but not right now" memory references or requests.

When the application 451 reaches the branch 303, there are several possibilities. The first possibility is that the memory requests for both instructions 304 and 305 have been completed. In that case, the application 451 can proceed down either the Yes or No path without delay. A second possibility is that only one memory request has been completed. According to the present invention, the memory request for instruction 305 is processed by the memory controller 14 first if it is determined to be a non-speculative memory request because a non-speculative request takes precedence over a speculative request, like the request for instruction 304. If the processor 30 chooses the Yes path, a memory request is sent requesting that the memory controller 14 update the memory request for instruction 304 from speculative to non-speculative. If the processor 30 chooses the No path, the processor 30 can send a memory request requesting that the memory request for instruction 304 be cancelled and the application 451 can then continue execution without delay.

A third possibility is that the software can reach the branch 303 with neither memory requests for instructions 304 and 305 completed. If the Yes path is chosen, the processor 30 can send a memory request to upgrade the memory request for instruction 304 from speculative to non-speculative. If the No path is chosen, the processor 30 can send a memory request to cancel the memory request for instruction 304. In either of the two cases of the third possibility, the application 451 is suspended while it waits for the completion of the memory requests. However, in a processor 30 without the disclosed techniques, the application 451 would wait for the memory controller 14 to fetch instruction 304 even if the application 451 takes the No path and no longer requires the instruction 304.

This example is for illustrative purposes only. In an actual computer, both instructions and data are fetched from memory. Instructions would not be fetched from memory one at a time, but would instead be requested in blocks containing multiple instructions, branches, and data. In addition, multiple processes on multiple processors might be running, all requiring the processor 30 to generate memory requests. Thus whole blocks of both instructions and data might be speculative or non-speculative. The principle is the same.

Figure 4:
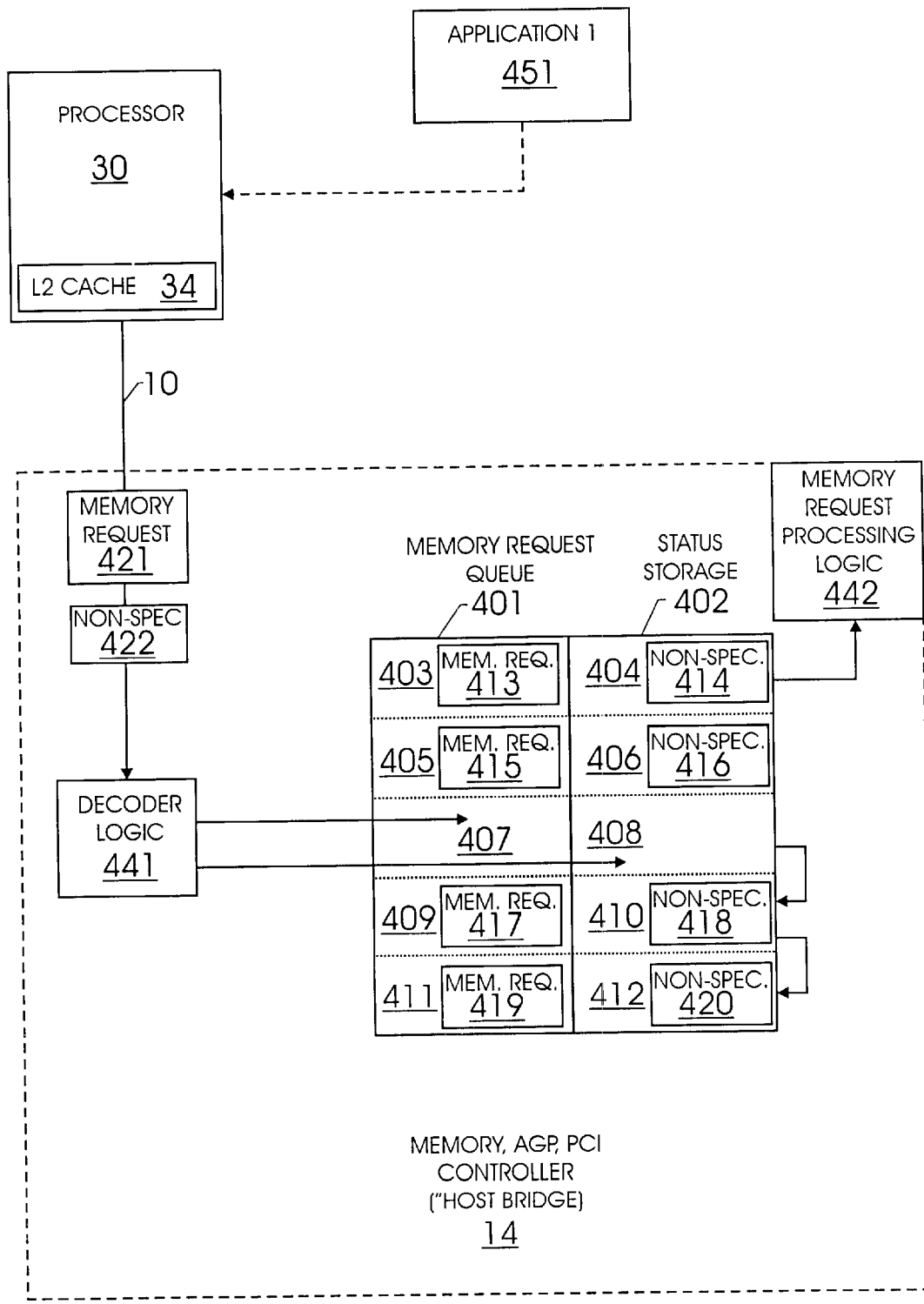
FIG. 4 is a diagram of a memory request queue showing a non-speculative memory request being inserted into a memory request queue ahead of speculative memory requests.

Turning to FIG. 4, a processor 30 executes a portion of the software 300 of an application 451. The processor 30, while executing the application 451, initiates a memory request 421 on the PCI bus 10 and further assigns, to the memory request 421, a status 422 with the value of non-speculative. Transaction decoder logic 441 is a scheduling logic within the memory controller 14, scheduling the memory request 421 by inserting it into a memory request queue 401. To make room for the memory request 421 in the memory request queue 401, already stored memory requests 417 and 419 and their associated statuses 418 and 420 are rescheduled. An already stored memory request 419 and its associated status 420, with a value of speculative, are moved to memory request queue location 411 and status storage location 412 respectively to create space in the memory request queue 401 at location 409 and in the status storage 402 at location 410. An already stored memory request 417 and its corresponding status 418, with a value of speculative, are moved to locations 409 and 410 respectively to create a space in the queue for the received memory request 421 and its corresponding status 422, with a value of non-speculative. The received memory request 421 and its corresponding status 422 are then inserted into the memory request queue 401 and the status storage 402 at locations 407 and 408 respectively.

In another embodiment, multiple queues can be used, one for non-speculative requests and one for speculative requests. In both cases, new requests are added onto the end of the appropriate queue. The speculative queue is read only if there are no requests in the non-speculative queue. In this way, the non-speculative queue is emptied before emptying of the speculative queue. This has the added benefit of naturally limiting the number of requests a processor is making. In a single processor system, large numbers of speculative requests are typically acceptable. But in a multiprocessor system, this type of behaviour consumes memory bandwidth that is needed by the other processors for non-speculative work. Having separate queues that are prioritized can allow a graceful transition from a single processor system to a multiprocessor system.

The memory request queue 401 is now ordered with higher priority memory requests 413 and 415, with their associated statuses 414 and 416 of values non-speculative, first and second in line to be sent to memory request processing logic 442. The processor memory request 421 and its associated status 422 of value non-speculative are next in line to be processed. The memory request 422 is followed by memory request 417 with its corresponding status 418 of value speculative and memory request 419 with its corresponding status 420 of value speculative. Typically, the processor 30 would generate the memory request 421 in an attempt to anticipate the needs of the application 451. Once the application 451 reaches a point in its execution where it needs the memory request 421, the memory request would already be completed and waiting for the application 451 in the processor's L2 cache 34. If the application 451 reaches a point in its execution where it needs the memory request 421 and the memory request 421 has not yet been completed by the memory request processing logic 442, the processor 30 might pause the application 451 and issue another memory request 421 to shorten the delay. If the memory request 421 had originally been assigned a status of speculative, the second memory request 421 would upgrade the previously stored memory request 421 from a status of speculative to non-speculative. If the processor 30 reaches a point in where it realizes that it is not going to need memory request 421, the processor 30 would generate a memory request indicating that the memory request 421 may be cancelled.

This is a logical description of the memory request insertion process; a system according to the invention could instead prioritize the memory requests in many different ways. For example, it can insert the memory request entry into any available spot in the queue and then resort the entire queue to maintain the relative ordering without changing the spirit of the invention. More preferably, the method of the disclosed technique can use pointers to memory requests and their associated statuses stored in another storage area so that, during a sort, only the pointers are changed and the memory requests and the statuses need not be moved. In addition, another embodiment can have separate queues for the processing of speculative and non-speculative memory requests. The memory controller 14 can process all requests in the non-speculative queue before servicing any requests from the speculative queue. Similarly, separate queues are often provided for code and data—these, too, can have associated speculative/non-speculative status or separate speculative/non-speculative queues. A further embodiment which uses a "needed, but not right now" status can employ a third queue.

Further, it also is not critical how the status is transmitted in conjunction with the bus transaction. The techniques according to the invention can be implemented in a variety of ways. For example, the embodiment of FIG. 3 illustrates a multiplexing of the priority with the transaction so that they are delivered sequentially over a single bus. In an alternative embodiment, a separate "status bus," which delivers the status simultaneously with the memory request, can be used. Further, a "change current status" command can instead be transmitted to adjust the status of an already stored memory request. A "delete memory request" command can be transmitted to prevent a memory request that is no longer needed from being processed. Whatever the technique, transmission of a memory request, associated with status information, allows a device, such as the memory controller 14, to more effectively process memory requests. By prioritizing memory requests over a bus based on status information, memory bandwidth can be more effectively utilized.

In one embodiment, a counter is associated with each request on a queue. Multiple processors can request the same memory cycle, resulting in a queue element with a counter greater than one. If a processor cancels its request, the counter is decremented. As long as the counter is positive, the request is still active for at least one processor and remains in the queue. If the counter becomes zero, the request has been cancelled by all requesting processors, and the queue element can be removed. In this embodiment, requests in a given queue can be prioritized based on the counter value, which indicates how many processors will benefit from the memory cycle when it completes.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system comprising:
   a processor producing memory requests and associated status information, the associated status information comprising:

speculative requests; and non-speculative requests;

a bus connected to the processor for carrying the memory requests and associated status information;

a mass storage subsystem; and a device coupled to the bus and responsive to the memory requests, the device processing the memory requests in an order based on the status information associated with the memory requests.

2. The computer system of claim 1, wherein the device is a memory controller.

3. The computer system of claim 1, wherein the memory requests are memory reads.

4. The computer system of claim 1, the device comprising:

a queue adapted to store the memory requests; and a status storage area adapted to store status information associated with each of the memory requests.

5. The computer system of claim 1, the device comprising:

a first queue adapted to store memory requests with an associated status of speculative; and a second queue adapted to store memory requests with an associated status of non-speculative.

6. The computer system of claim 5, the associated status information further comprising:

needed-later requests, the device further comprising:

a third queue adapted to store memory requests with an associated status information of needed-later requests.

7. The computer system of claim 1, further comprising:

scheduling logic that delays the servicing of memory transactions with an associated status of speculative until all memory transactions with an associated status of non-speculative have been serviced.

8. The computer system of claim 1, wherein a memory request produced by the processor comprises:

an indication that the status of a previous memory request has changed from speculative to non-speculative.

9. The computer system of claim 8, the device further comprising:

logic to change the status information of a previous memory request from speculative to non-speculative upon receipt of a memory request indicating that the status information of the previous memory request has changed from speculative to non-speculative.

10. The computer system of claim 1, wherein a memory request produced by the processor comprises:

an indication that a previous memory request should be canceled.

11. The computer system of claim 10, the device further comprising:

logic to delete a previous memory request upon receipt of a memory request indicating that the previous memory request can be canceled.

12. The computer system of claim 11, the logic to delete a previous memory request comprising:

a counter associated with the previous memory request, the counter incremented when a processor makes a memory request and decremented when the processor cancels a memory request, the previous memory request being deleteable only when the counter is zero.

13. A device for processing memory requests that have associated status information within a computer system, the device comprising:

a first transaction queue having transaction entries that are stored for later processing;

a status storage containing status entries that correspond to the transaction entries, each status entry associating a status information to a corresponding transaction entry, the status information comprising:

a speculative request or a non-speculative request;

a transaction decoder for receiving the memory requests and the associated statuses, the transaction decoder storing the received memory requests in the transaction queue as transaction entries and storing the received associated statuses corresponding to the received memory requests as status entries in the status storage; and logic to delay processing of the memory requests with an associated status of speculative until stored memory requests with an associated status of non-speculative are processed.

14. The device of claim 13, wherein the device is a memory controller.

15. The device of claim 13, wherein the memory requests are memory reads.

16. The device of claim 13, further comprising:

a second transaction queue, wherein memory requests with an associated status information of speculative are stored in the first transaction queue and memory requests with an associated status of non-speculative are stored in the second transaction queue.

17. The device of claim 16, the status information further comprising:

a needed-later request, the device further comprising:

a third transaction queue, adapted to store memory requests with an associated status of the needed-later requests.

18. The device of claim 13, wherein the memory request is an indication that the status of a previous memory request has changed from speculative to non-speculative.

19. The device of claim 18, further comprising:

logic to change the status information of a previous memory request from speculative to non-speculative upon receipt of a memory request indicating that the status information of the previous memory request has changed from speculative to non-speculative.

20. The device of claim 13, wherein the memory request comprises:

an indication that a previous memory request can be canceled.

21. The device of claim 20, further comprising:

logic to delete a previous memory request upon receipt of a memory request indicating that the previous memory request can be canceled.

22. A method for processing memory requests that have associated priorities within a computer system, the method comprising the steps of:

providing a memory request and associated status information from a processor; the status information comprising:

speculative or non-speculative;

receiving the memory request and the associated status information at a bus device; and processing memory requests with an associated status of non-speculative before processing memory requests with a status of speculative.

23. The method of claim 22, wherein the bus device is a memory controller.

24. The method of claim 22, wherein the received memory request is a memory read.

25. The method of claim 22, wherein the memory request is stored in a transaction queue and the associated status information is stored in a status storage area.

26. The method of claim 22, wherein memory requests with an associated status information of speculative are stored in a speculative request queue and memory requests with an associated status information of non-speculative are stored in a non-speculative request queue.

27. The method of claim 22, wherein the memory request comprises:

an indication that the status information of a previous memory request has changed from speculative to non-speculative.

28. The method of claim 27, further comprising the step of:

changing the status information associated with a first memory request from speculative to non-speculative upon receipt of a second memory request indicating that the status of the first memory request has changed from speculative to non-speculative.

29. The method of claim 22, wherein the memory request comprises:

an indication that a memory request can be canceled.

30. The method of claim 29, further comprising the step of:

deleting a memory request upon receipt of a memory request indicating that the memory request can be canceled.

31. The method of claim 30, the step of providing a memory request comprising the steps of:

providing a counter; and incrementing the counter for each processor generating the memory request, the step of deleting a memory request comprising the steps of:

decrementing the counter; and deleting the memory request if the counter is zero.

32. The method of claim 22, the status information further comprising:

a needed-later request, wherein there is a dedicated transaction queue for memory requests with an associated status of needed-later requests.

* * * * *